March 2, 1926.
C. E. BEATTY
1,575,523
AUTOMOBILE HEADLIGHT
Filed Nov. 28, 1924
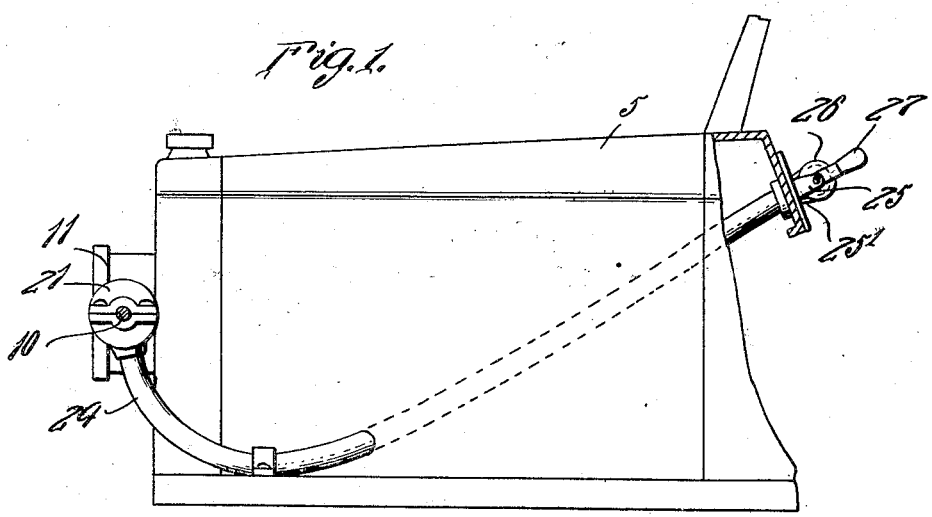
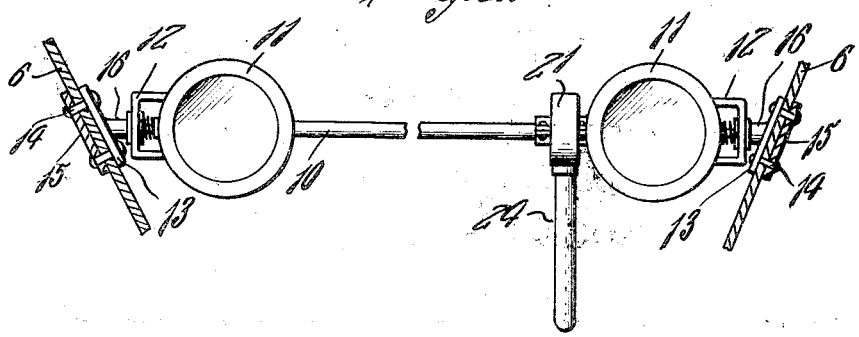
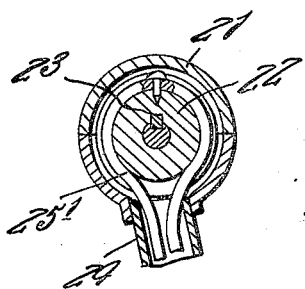 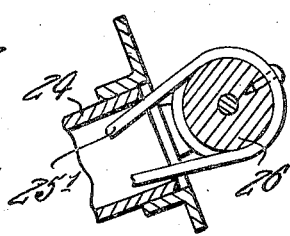 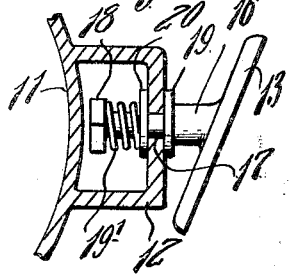
C. E. Beatty
INVENTOR
BY Victor J. Evans
ATTORNEY Patented Mar. 2, 1926.

1,575,523

UNITED STATES PATENT OFFICE.

CLARENCE E. BEATTY, OF DES MOINES, IOWA.

AUTOMOBILE HEADLIGHT.

Application filed November 28, 1924. Serial No. 752,785.

*To all whom it may concern:*

Be it known that I, CLARENCE E. BEATTY, a citizen of the United States, residing at Des Moines, in the county of Polk and State of Iowa, have invented new and useful Improvements in Automobile Headlights, of which the following is a specification.

My invention relates to automobile headlights and its primary object is to provide an automobile headlight which is capable of being adjusted about a horizontal axis to focus the light rays at any desired angle.

A further object of the invention is to provide an automobile headlight which may be operated to throw the light rays directly on the ground and out of the vision of the driver of an approaching automobile so that the light rays will not blind the driver.

Still another object of the invention is to provide an automobile headlight provided with manually operable means for throwing the light about a horizontal axis together with means for normally supporting the light in a horizontal position against accidental pivotal movement due to the vibration of the automobile.

With the preceding and other objects and advantages in mind, the invention consists in the novel combination of elements, constructions and arrangement of parts and operations to be hereinafter specifically referred to, claimed and illustrated in the accompanying drawings, wherein:

Figure 1 is a fragmentary view partly in elevation and partly in section of an automobile equipped with my invention.

Figure 2 is a fragmentary transverse sectional view of an automobile, with the invention applied thereto.

Figure 3 is a detail sectional view of the operative connection between the lamp support and actuating means.

Figure 4 is a similar view of the actuating means, and Figure 5 is a fragmentary detail view illustrating the manner of supporting the lamps on the mud guards of the vehicle.

Referring to the drawings in detail wherein corresponding characters of reference denote corresponding parts throughout the several views, the numeral 5 designates an automobile provided with the usual mud guards 6.

Arranged transversely of the forward end of the automobile and disposed between the mud guard is a horizontally disposed rock shaft 10 to which a pair of headlights 11 are fixed. U-shaped yokes 12 are formed with the side walls of the lamps 11 and plates 13 are disposed upon the inner faces of the fenders 6 and are secured thereto by means of rivets or other fastenings 14, the latter passing through retaining plates 15 disposed upon the outer face of the fenders. Castings 6 are formed with the plates 15 and projecting from the castings 16 are spindles 17 which extend through the yokes 12 to rotatably support the latter. These spindles 17 terminate in heads 18 while the castings are formed with annular shoulders 19 which contact with the yokes. Encircling the spindles 17 are coil springs 19 which bear against the heads 18 and friction producing washers 20 are slidable on the spindles 17. These coil springs 19 hold the washers 20 against the yokes with sufficient force as to hold the yokes against accidental pivotal movement.

Encircling the shaft 10 and fixed thereto is a circular casing 21 in which a grooved pulley 22 is mounted, the latter being keyed to the rock shaft 10 as at 23. A longitudinally curved tube 24 extends from the casing 21 and leads to the dashboard of the automobile as shown in Figure 1. A pair of ears 25 is formed on the dashboard and rotatable between these ears is a second pulley 26 to which an operating handle 27 is secured.

From the disclosure it will be apparent that upon rocking the lever 27 downwardly the pulley 26 will be rotated to actuate the endless belt or cable 25' to in turn rotate the pulley 22 to rock the shaft 10 and consequently tilt the headlights 11.

While I have shown and described the preferred embodiment of the invention, I desire to have it understood that such changes may be made in the form, construction, arrangement of parts and operations as will not depart from the spirit of the invention or the scope of the subjoined claim.

What is claimed is:

The combination with the front mud guards of an automobile, inwardly directed spindles carried by the mud guards, an annular shoulder formed on each of the spindles, a pair of connected headlights, normally vertically arranged U-shaped yokes carried by each of the headlights and receiving the spindles for rotation therein, washers on the spindles and engaging the U-shaped yokes at a point opposite the annular shoulders, abutments on the inner ends of the spindles and expansible coil springs encircling the spindles and engaging the abutments and washers for normally holding the washers in contacting engagement with the U-shaped yokes, and at the same time holding the yokes against the annular shoulders to prevent casual movement of the headlights and flexible means for tilting the latter in unison when desired.

In testimony whereof I affix my signature.

CLARENCE E. BEATTY.